Patented Aug. 28, 1951

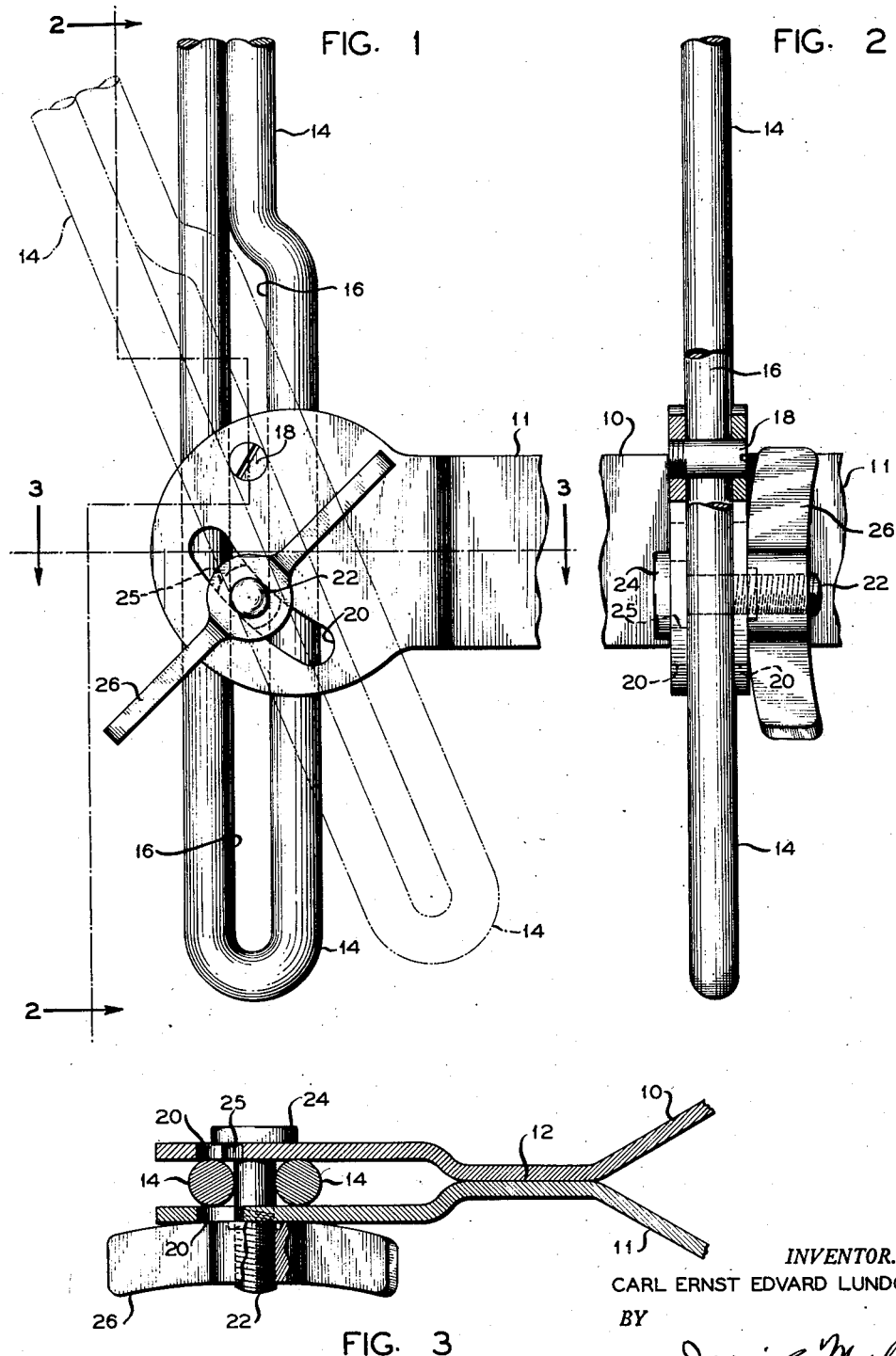

2,565,867

UNITED STATES PATENT OFFICE 2,565,867

LOCKING DEVICE FOR CHAIRS

Carl Ernst Edvard Lundquist, Stockholm, Sweden

Application June 4, 1945, Serial No. 597,455
In Sweden June 20, 1944

2 Claims. (Cl. 155—157)

My invention relates to chairs and more particularly to a device for locking the back of the chair in different angular positions relative to the seat thereof. Still more particularly the invention relates to locking devices comprising two bolt-shaped, spaced elements, one of which is movable in an elongated guide slot in a member connected to the chair seat, said guide slot extending in a path deviating from a circular arc having the other element as its centre, the position of which is in turn fixed relative to said member. It is the main object of the invention to provide a locking device of this kind, which is cheaper in manufacture and simpler in operation than are the known constructions.

Further objects and advantages of the invention will be apparent from the following description considered in connection with the accompanying drawing which forms a part of this specification, and of which:

Fig. 1 shows a side elevation of a portion of a chair provided with a locking device according to the invention.

Fig. 2 shows the same parts viewed from the rear side of the chair, this figure being a part sectional view on line II—II of Fig. 1 and having a portion of the back of the chair cut away.

Fig. 3 is a section on the line III—III of Fig. 1.

In the drawing, 10 and 11 designate supporting arms connected with the chair seat (not shown). Said arms may be in the form of horizontally spaced bars having inwardly offset abutting portions secured together, as by welding as shown at 12. The free ends of the arms behind this welded portion extend in parallel spaced relationship. The back of the chair is supported by a post, which in the embodiment shown is made from a bar 14 bent in a manner to form a closed elongated guide or slot 16. A bolt 18 is threaded into the arm 10, extends through the slot 16 and has its opposite end supported in a circular opening in arm 11. The arms are each provided with an elongated guide slot 20, the walls of which follow a curve deviating from a circular are described about the centre of the bolt 18, the rear portion of the guide slot 20 being preferably situated on a higher level than the front portion thereof, as will be seen from Fig. 1. A bolt 22 movably engages the guide slots 20 as well as the slot 16. The bolt 22 is provided on the outside of the arm 10 with a head 24 having flat surfaces 25 which extend into one slot 20, so that the bolt cannot rotate relative to the arms. A wing nut 26 or the like is threaded onto the bolt 22 outside the arm 11.

The post 14 can be adjusted to different angular positions by loosening the wing nut 26, the post then swinging about the bolt 18, while the bolt 22 slides in the slot 16 as well as in the slots 20. If desired, the post 14 is also adjustable to different vertical positions relative to the arms 10 and 11, and in this case it moves relative to both the bolts 18 and 22. After the wing nut has been tightened again, the friction set up ensures a very rigid connection between the members 10, 11, and 14.

The guide slots 20 are curved in such manner that the post 14 may be turned without undue resistance, after the wing nut 26 has been loosened. In order to provide for the same resistance to rotation at all angular positions of the post 14, when the wing nut is locked, the slots 20 may have a curved shape such that the angle between a line connecting the axes of the bolts 18 and 22 and the tangent to the curve at the point determined by the position of bolt 22 is constant or approximately so.

While one more or less specific embodiment of the invention has been shown, it is to be understood that this is for purpose of illustration only, and that the invention is not to be limited thereby, but its scope is to be determined by the appended claims.

What I claim is:

1. In a chair having an adjustable back, a seat provided with an elongated slot, said slot being angularly inclined forwardly and downwardly of said seat, a back portion provided with an elongated guideway, a pair of vertically spaced pivot elements connecting said seat and back portion, the upper pivot element being fixed relative to said seat and slidable in said elongated guideway, the lower pivot element being slidable relative to both seat and back portion, said slot being located beneath said upper pivot element, the forward and downward inclination thereof being in continuously increasing spaced relation with respect to said upper pivot element, and means for tightening said lower pivot element to secure said seat and back portion in adjusted position.

2. In a chair having an adjustable back, a seat support comprising a pair of arms secured to each other with the free extremities thereof extending rearwardly in parallel spaced relationship, each of said extremities being provided with an elongated slot extending forwardly and downwardly thereof, a back support comprising a bar bent upon itself to provide a substantially vertically disposed elongated guideway, said bar being received between the free extremities of said seat support, a pair of vertically spaced pivot elements connecting said seat and back supports, the upper pivot element being fixed relative to said seat support and slidable in said elongated guideway, the lower pivot element being located in said slots in said seat support and in said guideway and being slidable relative to both said seat and back supports, said slots being opposed to each other and the forward and downward inclination thereof being in continuously increasing spaced relation with respect to said upper pivot element, and means for tightening said lower pivot element to bind said opposed extremities of said seat support against said bent portion of said bar to secure said seat and back supports in adjusted position.

CARL ERNST EDVARD LUNDQUIST.

REFERENCES CITED

The following references are of record in the file of this patent:

UNITED STATES PATENTS

| Number | Name | Date |
| --- | --- | --- |
| 2,147,439 | Herold | Feb. 14, 1939 |

FOREIGN PATENTS

| Number | Country | Date |
| --- | --- | --- |
| 555,632 | Great Britain | of 1943 |